United States Patent [19]
Chitnis et al.

[11] Patent Number: 5,183,790
[45] Date of Patent: Feb. 2, 1993

[54] USE OF ZSM-57 IN CATALYTIC CRACKING FOR GASOLINE OCTANE IMPROVEMENT AND CO-PRODUCTION OF LIGHT OLEFINS

[75] Inventors: Girish K. Chitnis, Chadds Ford, Pa.; Joseph A. Herbst, Turnersville, N.J.; Ernest W. Valyocsik, Yardley, Pa.

[73] Assignee: Mobil Oil Corp., Fairfax, Va.

[21] Appl. No.: 790,621

[22] Filed: Nov. 8, 1991

Related U.S. Application Data

[62] Division of Ser. No. 645,167, Jan. 24, 1991, Pat. No. 5,098,555.

[51] Int. Cl.$^5$ ............................................. B01J 502/67
[52] U.S. Cl. ..................................................... 502/67
[58] Field of Search ........................................ 502/67

[56] References Cited

U.S. PATENT DOCUMENTS

| | | | |
|---|---|---|---|
| 3,758,402 | 9/1973 | Oleck et al. | 502/67 |
| 4,324,940 | 4/1982 | Dessau | 585/466 |
| 4,740,292 | 4/1988 | Chen et al. | 208/120 |
| 4,873,067 | 10/1989 | Valyocsik | 423/328 |
| 4,898,806 | 9/1989 | Degnan et al. | 208/111 |
| 4,960,505 | 10/1990 | Minderhoud et al. | 208/143 |
| 4,976,847 | 12/1990 | Maxwell | 208/120 |
| 5,039,640 | 8/1991 | Absil et al. | 502/67 |

*Primary Examiner*—Carl F. Dees
*Attorney, Agent, or Firm*—Alexander J. McKillop; Charles J. Speciale; Edward F. Kenehan, Jr.

[57] ABSTRACT

The catalytic cracking of a hydrocarbon oil to provide a product of increased octane number and increased light olefin content is carried out employing a cracking catalyst composition containing both a large port crystalline zeolite component and a ZSM-57 zeolite component.

16 Claims, No Drawings

USE OF ZSM-57 IN CATALYTIC CRACKING FOR GASOLINE OCTANE IMPROVEMENT AND CO-PRODUCTION OF LIGHT OLEFINS

CROSS-REFERENCE TO RELATED APPLICATION

This application is a division of copending U.S. application Ser. No. 07/645,167, filed Jan. 24, 1991, now U.S. Pat. No. 5,098,555, the entire disclosure of which is expressly incorporated herein by reference.

BACKGROUND

This invention relates to improvements in the catalytic cracking of hydrocarbons and, in particular, is directed to a process for the catalytic cracking of hydrocarbon oils to produce higher light olefin yields and increased gasoline octane number. The cracking catalyst used herein is a mixture of a large pore crystalline molecular sieve such as zeolite Y and a zeolite referred to herein as zeolite ZSM-57.

Zeolitic materials, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept adsorption molecules of certain dimensions while rejecting those of larger dimensions, these materials have come to be known as "molecular sieves" and are utilized in a variety of ways to take advantage of these properties. Such molecular sieves, both natural and synthetic, include a wide variety of positive ion-containing crystalline silicates. These silicates can be described as a rigid three-dimensional framework of $SiO_4$ and Periodic Table Group IIIA element oxide, e.g., $AlO_4$, in which the tetrahedra are cross-linked by the sharing of oxygen atoms whereby the ratio of the total Group IIIA element, e.g., aluminum, and silicon atoms to oxygen atoms is 1:2. The electrovalence of the tetrahedra containing the Group IIIA element, e.g., aluminum, is balanced by the inclusion in the crystal of a cation, e.g., an alkali metal or an alkaline earth metal cation. This can be expressed wherein the ratio of the Group IIIA element, e.g., aluminum, to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given silicate by suitable selection of the cation. The spaces between the tetrahedra are occupied by molecules of water prior to dehydration.

Prior art techniques have resulted in the formation of a great variety of synthetic zeolites. Many of these zeolites have come to be designated by letter or other convenient symbols, as illustrated by zeolite Z (U.S. Pat. No. 2,882,243); zeolite X (U.S. Pat. No. 2,882,244); zeolite Y (U.S. Pat. No. 3,130,007); zeolite ZK-5 (U.S. Pat. No. 3,247,195); zeolite ZK-4 (U.S. Pat. No. 3,314,752); zeolite ZSM-5 (U.S. Pat. No. 3,702,886); zeolite ZSM-11 (U.S. Pat. No. 3,709,979); zeolite ZSM-12 (U.S. Pat. No. 3,832,449); zeolite ZSM-20 (U.S. Pat. No. 3,972,983); zeolite ZSM-35 (U.S. Pat. No. 4,016,245); and zeolite ZSM-23 (U.S. Pat. No. 4,076,842), merely to name a few.

The $SiO_2/Al_2O_3$ ratio of a given zeolite is often variable. For example, zeolite X can be synthesized with $SiO_2/Al_2O_3$ ratios of from 2 to 3; zeolite Y, from 3 to about 6. In some zeolites, the upper limit of the $SiO_2/Al_2O_3$ ratio is unbounded. ZSM-5 is one such example wherein the $SiO_2/Al_2O_3$ ratio is at least 5 and up to the limits of present analytical measurement techniques. U.S. Pat. No. 3,941,871 (Re. 29,948) discloses a porous crystalline silicate made from a reaction mixture containing no deliberately added alumina in the recipe and exhibiting the X-ray diffraction pattern characteristic of ZSM-5. U.S. Pat. Nos. 4,061,724; 4,073,865; and 4,104,294 describe crystalline silicates of varying alumina and metal content.

The catalytic cracking of hydrocarbon oils utilizing zeolites is a known process, practiced, for example, in fluid-bed catalytic cracking (FCC) units, moving bed or thermofor catalytic cracking (TCC) reactors and fixed bed crackers. Zeolites have been found to be particularly effective for the catalytic cracking of a gas oil to produce motor fuels and have been described and claimed in many patents including U.S. Pat. Nos. 3,140,249; 3,140,251; 3,140,252; 3,140,253; and 3,271,418. It is also known in the prior art to incorporate the crystalline zeolite into a matrix for catalytic cracking and such disclosure appears in one or more of the above-identified U.S. patents.

It is also known that improved results can be obtained with regard to the catalytic cracking of gas oils if a zeolite having a pore size of less than about 7 Angstrom units, e.g., zeolite A, is included with a crystalline zeolite having a pore size greater than about 8 Angstrom units, e.g., rare earth-treated zeolite X or Y, either with or without a matrix. A disclosure of this type is found in U.S. Pat. No. 3,769,202. Although the incorporation of a crystalline zeolite having a pore size of less than about 7 Angstrom units into a catalyst composite comprising a large pore size crystalline zeolite (pore size greater than about 8 Angstrom units) has indeed been very effective with respect to raising the octane number, it does so at the expense of overall gasoline yield.

Improved results in catalytic cracking with respect to both octane number and overall gasoline yield are disclosed in U.S. Pat. No. 3,758,403. The cracking catalyst comprises a large pore size crystalline zeolite (e.g., pore size greater than about 8 Angstrom units) such as zeolite Y in admixture with a smaller pore zeolite, e.g. ZSM-5, wherein the ratio of smaller pore zeolite to large pore size crystalline zeolite is in the range of 1:10 to 3:1. Effective cracking was achieved when the catalyst was used to obtain the inherent advantages realized in moving bed techniques such as the Thermofor Catalytic Cracking Process (TCC) as well as in fluidized cracking processes (FCC).

The use of zeolites such as ZSM-5 in conjunction with a zeolite cracking catalyst of the X or Y faujasite variety is described in U.S. Pat. Nos. 3,894,931; 3,894,933; and 3,894,934. The two former patents disclose the use of a ZSM-5 zeolite in amounts of about 5–10 wt. %; the latter patent discloses the weight ratio of ZSM-5 zeolite to large pore size crystalline zeolite within the range of 1:10 to 3:1.

The addition of a separate additive or composite catalyst comprising one or more members of a class of zeolites such as ZSM-5 has been found to be extremely efficient as an octane and total gasoline yield improver when used in very small amounts in conjunction with a conventional cracking catalyst. Thus, in U.S. Pat. Nos. 4,309,279; 4,309,280; and 4,368,114, it was found that only 0.1 to 0.5 wt. % of ZSM-5 added to a conventional cracking catalyst under conventional cracking operations could increase octane by about 1-3 RON (Research Octane Number Without Lead).

U.S. Pat. No. 4,740,292 discloses a catalytic cracking process which employs a mixture of a faujasite-type zeolite as base cracking catalyst and zeolite Beta. Use of this catalyst mixture results in improved cracking activity, increased octane of the product gasoline and increased gasoline plus alkylate-precursor yields relative to the base catalyst alone.

SUMMARY

There is provided a catalytic cracking process which comprises catalytically cracking a hydrocarbon feed with a cracking catalyst composition comprising, as a first component, a large pore crystalline molecular sieve and, as a second component, ZSM-57.

There is also provided a cracking catalyst composition comprising, as a first component, a large pore crystalline molecular sieve and, as a second component, ZSM-57.

In accordance with the present invention, an improved process for increasing light olefin yields and octane of gasoline boiling range product has now been discovered. This desirable result is obtained by the use of a catalyst composition comprising one or more large pore crystalline molecular sieves combined with zeolite ZSM-57.

The first component of the catalyst composition employed in the process of the invention is a large pore crystalline molecular sieve, such a material normally having a Constraint Index (as defined in U.S. Pat. No. 4,016,218) less than 1. Large pore crystalline molecular sieves are well known in the art and include faujasite, mordenite, zeolite X, rare earth-exchanged zeolite X (REX), zeolite Y, zeolite Y (HY), rare earth-exchanged zeolite Y (REY), ultrastable zeolite Y (USY), rare earth-exchanged ultrastable zeolite Y (RE-USY), dealuminated Y (DAY), ultrahydrophobic zeolite Y (UHP-Y), dealuminated silicon enriched zeolites such as LZ-210 and zeolite ZK-5, zeolite ZK-4, zeolite Beta, zeolite Omega, zeolite L, ZSM-20 and other natural or synthetic zeolites. A more thorough description of faujasite zeolites may be found in Chapter 2 of Breck, Donald W., *Zeolite Molecular Sieves*, Robert E. Krieger Publishing Co., Malabar, Fla., 1984, with specific reference to pages 92-107.

Other large pore crystalline molecular sieves which are useful herein include pillared silicates and/or clays; aluminophosphates, e.g., $AlPO_4$-5, $AlPO_4$-8, VPI-5; silicoaluminophosphates, e.g., MCM-9, SAPO-5, SAPO-37, SAPO-31, SAPO-40, SAPO-41; and other metal aluminophosphates. These materials are variously described in U.S. Pat. Nos. 4,440,871; 4,554,143; 4,567,029; 4,666,875; and 4,742,033.

The additional component of the catalyst system which is employed in the cracking process herein, zeolite ZSM-57, is a porous crystalline molecular sieve characterized by an X-ray diffraction pattern including values substantially as set forth in Table 1 of U.S. Pat. No. 4,873,067.

In carrying out the cracking process of this invention, a suitable hydrocarbon feedstock is heated with the catalyst composition under conversion conditions which are appropriate for cracking. During conversion, the aromatics and naphthenes which are present in the feedstock undergo cracking reactions such as dealkylation, isomerization and ring opening. Additionally, paraffins in the feedstock crack to lower molecular weight species and/or isomerize.

The process of this invention enables heavy feedstocks such as gas oils boiling above about 420° F. to be converted to gasoline range products boiling below about 420° F. and distillates boiling in the 420°-650° F. range. Use of the catalyst composition of this invention results in increased octane of the product gasoline and increased light olefin yields relative to that obtained employing large pore crystalline silicate cracking catalysts alone.

As mentioned above, the present hydrocarbon conversion process combines elements of cracking and isomerization. The catalyst used in the process comprises a mixture of a large pore (e.g., greater than about 8 Angstroms) crystalline molecular sieve, e.g., faujasite, mordenite, zeolites X, REX, Y, HY, REY, USY, RE-USY, DAY, UHP-Y, LZ-210, ZSM-20, Beta, Omega, L, VPI-5, $AlPO_4$-8, MCM-9, etc., and the porous crystalline material ZSM-57.

ZSM-57 is described in U.S. Pat. No. 4,873,067, the entire disclosure of which is expressly incorporated herein by reference.

Prior to its use as catalyst, the as-synthesized ZSM-57 crystals should be subjected to thermal treatment to remove part or all of any organic constituent present therein.

Zeolite ZSM-57, especially in its metal, hydrogen and ammonium forms, can be beneficially converted to another form by thermal treatment. This thermal treatment is generally performed by heating one of these forms at a temperature of at least about 370° C. for at least 1 minute and generally not longer than 20 hours. While subatmospheric pressure can be employed for the thermal treatment, atmospheric pressure is preferred simply for reasons of convenience. The thermal treatment can be performed at a temperature of up to about 925° C.

Prior to its use in the catalytic cracking process of this invention, the zeolite ZSM-57 crystals can be at least partially dehydrated. This can be achieved by heating the zeolite crystals to a temperature in the range of from about 100° C. to about 595° C. in an atmosphere such as air, nitrogen, etc., and at atmospheric, subatmospheric or superatmospheric pressures for between about 30 minutes to about 48 hours. Dehydration can also be performed at room temperature merely by placing the crystalline material in a vacuum, but a longer time is required to obtain a sufficient amount of dehydration.

The ZSM-57 crystals can be shaped into a wide variety of particle sizes. Generally speaking, the particles can be in the form of a powder, a granule, or a molded product such as an extrudate having a particle size sufficient to pass through a 2½ mesh (Tyler) screen and be substantially retained on a 400 mesh (Tyler) screen. In cases where the catalyst is molded, such as by extrusion, the crystals can be extruded before drying or partially dried and then extruded.

It may be desired to incorporate either or both components of the catalyst system herein with another material which is resistant to the temperatures and other conditions employed in the cracking process of this invention. Such materials include active and inactive materials and other synthetic or naturally occurring porous crystalline molecular sieves as well as inorganic materials such as clays, silica and/or metal oxides such as alumina. The latter may be either naturally occurring or in the form of gelatinous precipitates or gels including mixtures of silica and metal oxides.

Naturally occurring clays which can be composited with either or both catalyst components herein include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification.

In addition to the foregoing materials, either or both catalyst components can be composited with one or more porous matrix materials such as silica, alumina, silica-alumina, silica-magnesia, silica-zirconia, silica-thoria, silica-beryllia, silica-titania as well as ternary oxide compositions such as silica-alumina-thoria, silica-alumina-zirconia, silica-alumina-magnesia, silica-magnesia-zirconia, and the like. It may also be advantageous to provide at least a part of the foregoing matrix materials in colloidal form so as to facilitate extrusion of the bound catalyst component(s).

The relative proportions of catalyst component(s) and binder can vary widely with the content of the former ranging from about 1 to about 95 percent by weight, and more usually from about 10 to about 70 weight percent, of the composite. The large pore crystalline cracking catalyst component and the ZSM-57 component can be independently composited with the same or different binder material or both materials can be incorporated together in the same binder material.

The amount of ZSM-57 catalyst component which is added to the large pore crystalline cracking catalyst component can be fairly small since the presence of even minor quantities of ZSM-57 in the combination catalyst can result in substantial octane gains. As those skilled in the art will appreciate, the exact weight percent of zeolite ZSM-57 relative to the total quantity of catalyst component may vary from cracking unit to cracking unit depending upon the desired octane, light olefin yields desired, the nature of the available feedstock and other similar factors. For many cracking operations, the weight percent of zeolite ZSM-57 relative to the total quantity of catalyst composition can range from about 0.01 to about 25 and preferably from about 0.1 to about 10.

The feedstock for the present conversion process comprises a heavy hydrocarbon such as a gas oil, coker tower bottoms fraction, reduced crude, vacuum tower bottoms, deasphalted vacuum resids, FCC tower bottoms, cycle oils, and the like. Oils derived from coal, shale or tar sands are also suitable as feedstocks herein. Oils of this kind generally have an initial boiling point of about 650° F. (343° C.) although the process is also useful with oils which have initial boiling points as low as 500° F. (260° C.). These heavy oils comprise high molecular weight long-chain paraffins and high molecular weight aromatics with a large proportion of fused ring aromatics. The heavy hydrocarbon oil feedstocks will normally contain a substantial fraction boiling above 450° F. and will normally have an initial boiling point of about 550° F. (288° C.) and more usually about 650° F. (343° C.). Typical boiling ranges will be about 650° F. to 1050° F. (343° C.-566° C.), or about 650° F. to 950° F. (343° C.-510° C.) but oils with a narrower boiling range may, of course, be processed, for example, those with a boiling range of about 650° F. to 850° F. (343° C.-454° C.). Heavy gas oils are often of this kind as are cycle oils and other nonresidual materials. It is possible to co-process materials boiling below 500° F. but the degree of conversion will be lower for such components. Feedstocks containing lighter ends of this kind will normally have an initial boiling point above about 300° F.

The present process is of a particular utility with highly paraffinic feeds because with feeds of this kind the greatest improvement in octane can often be obtained. However, benefits can also be achieved with relatively non-waxy feeds.

Processing can be carried out under conditions similar to those used for known types of catalytic cracking processes. Thus, process temperatures of from about 750° F. to about 1200° F. can be used. Preferably, temperatures of from about 840° F. to about 1050° F. are employed. The liquid hourly space velocity (LHSV) of the feedstock can generally range from about 0.1 to about 20 $hr^{-1}$ and preferably from about 0.1 to about 10 $hr^{-1}$.

The conversion can be conducted by contacting the feedstock with a fixed stationary bed of catalyst, a fixed fluidized bed or with a transport bed. The catalyst can be regenerated by burning in air or other oxygen-containing gas.

A preliminary hydrotreating step to remove nitrogen and sulfur and to saturate aromatics to naphthenes without substantial boiling range conversion will usually improve catalyst performance and permit lower temperatures, higher space velocities or combinations of these conditions to be employed.

ZSM-57, as an additive to cracking catalysts, has been found to enhance the gasoline octane. The resultant gasoline RON boost is accompanied by a decrease in gasoline yield and increases in $C_3$ and $C_4$ olefins and isobutane yields. The loss in gasoline yield is more than made up if the potential alkylate is taken into account. The $C_3$ and $C_4$ olefins are also potential feeds to light olefins upgrading processes such as methyl tert-butyl ether (MTBE) synthesis, diisopropyl ether synthesis (DIPE), Mobil olefin to gasoline and distillate (MOGD) and Mobil olefin to distillate and lube (MODL) to couple the catalytic cracking process with one or more of the light olefins upgrading processes.

In addition to the first large pore molecular sieve component and the second ZSM-57 component, the present catalyst may include at least one additional molecular sieve component. Examples of such additional components include zeolites, other than ZSM-57, having a Constraint Index from 1 to 12. Examples of such zeolites include ZSM-5, ZSM-11, ZMS-22, ZSM-23, ZSM-35, ZSM-48 and MCM-22. MCM-22 is described in U.S. Pat. No. 4,954,325.

In accordance with data reported in Example 8 hereinafter, it has been discovered that when a ZSM-57 component was added to an REY component a higher propylene to butene ratio in the products was produced than when a ZSM-5 component was added to the REY component. Accordingly, when a three component catalyst composition is used, the relative amounts of ZMS-57 and ZSM-5 can be adjusted, before or during the cracking process, to adjust the propylene to butene ratio in the products produced.

The present catalyst composition may include additives to promote the oxidation of carbon monoxide to carbon dioxide. Such additives include rhenium and/or one or more noble metals, such as Pt, Pd or Ru.

EXAMPLE 1

A ZSM-57 fluid catalyst was prepared by spray drying an aqueous slurry containing 25 wt % ZSM-57 in a $SiO_2$-$Al_2O_3$ (93/7) gel/clay matrix, ammonium exchanging the spray dried catalyst and calcining the exchanged catalyst. The calcination was carried out at 1000 deg.F. for 2 hours in air followed by re-exchanging with ammonium nitrate solution to further lower the $Na_2O$.

EXAMPLE 2

The base case catalyst employed in the present study was an REY catalyst removed from a commercial FCC unit following oxidative regeneration.

EXAMPLES 3-6

The catalysts of Examples 1,2 were blended to give the following ZSM-57 levels in the blend:

| Example | Wt % ZSM-57 |
|---|---|
| 3 | 2 |
| 4 | 0.5 |
| 5 | 0.25 |
| 6 | 0.1 |

EXAMPLE 7

The catalysts of Examples 2-6 were evaluated in a fixed-fluidized bed (FFB) unit at 960° F. temperature, 1.0 minute catalyst contact time using Sour Heavy Gas Oil (SHGO) as feed and varying the catalyst/oil ratios. The FFB results (after interpolation at 70 vol % conversion) are summarized in Table 2. Yield/octane shifts for the catalysts of Examples 4-6 (versus the base case catalyst of Example 2) are summarized in Table 3. The results from Tables 2 and 3 show the following:

ZSM-57 shows octane enhancement activity as measured by RON. The activity increases with the ZSM-57 level in the blend.

The RON boosts are in 1-3 range.

For each 1.0 RON boost, the gasoline yield decreases by ~5 vol % at all ZSM-57 levels tested.

The gasoline yield loss is accompanied by increases in the $C_3=$, $C_4=$ and i-$C_4$ yields which are potential feeds for alkylation. The gasoline yield loss is more than made up if the potential alkylate is taken into account. The increased $C_3=$, $C_4=$ yields are also potential feeds for light olefin upgrading processes such as methyl tert-butyl ether (MTBE) synthesis, diisopropyl ether synthesis (DIPE), Mobil olefin to gasoline (MOG), Mobil olefin to gasoline and distillate (MOGD) and Mobil olefin to distillate and lube (MODL) processes. The product value of catalytic gas oil cracking can be significantly increased by coproducing light olefins in the FCC unit and upgrading the light olefins to premium fuel and lube products with one or more suitable processes such as MTBE, DIPE, MOG, MOGD and MODL.

TABLE 2

|  | ZSM-57 LEVEL, wt % | | | | |
|---|---|---|---|---|---|
|  | BASE | 2% | 0.5% | 0.25% | 0.1% |
| CONVERSION, % VOL | 70.0 | 70.0 | 70.0 | 70.0 | 70.0 |
| CONVERSION, % WT. | 67.3 | 67.0 | 67.1 | 67.2 | 67.1 |
| $C_5$ GASOLINE, % VOL | 52.2 | 34.8 | 42.6 | 46.0 | 48.0 |
| $C_5$ GASOLINE, % WT. | 43.1 | 29.4 | 35.7 | 38.2 | 39.8 |
| TOTAL $C_4$, % VOL | 16.9 | 25.2 | 18.3 | 17.8 | 16.9 |
| DRY GAS, % WT | 8.2 | 15.1 | 14.0 | 11.8 | 11.1 |
| COKE, % WT | 5.50 | 6.32 | 5.81 | 5.84 | 5.53 |
| C-ON-CAT, FINAL, % WT | 0.97 | 1.20 | 1.18 | 1.14 | 1.07 |
| N—$C_5$, % VOL | 0.5 | 0.3 | 0.2 | 0.2 | 0.2 |
| I—$C_5$, % VOL | 5.6 | 4.7 | 5.0 | 6.2 | 6.0 |
| $C_5=$, % VOL | 4.0 | 4.2 | 3.5 | 4.1 | 3.9 |
| N—$C_4$, % VOL | 1.2 | 1.1 | 0.8 | 1.0 | 1.0 |
| N—$C_4$, % WT | 0.8 | 0.7 | 0.5 | 0.7 | 0.6 |
| I—$C_4$, % VOL | 7.8 | 13.0 | 9.4 | 8.5 | 8.3 |
| I—$C_4$, % WT | 4.7 | 8.0 | 5.8 | 5.2 | 5.0 |
| $C_4=$, % VOL | 7.9 | 11.2 | 8.1 | 8.3 | 7.7 |
| $C_4=$, % WT | 5.2 | 7.4 | 5.3 | 5.5 | 5.1 |
| $C_3$, % VOL | 2.3 | 4.7 | 3.5 | 3.3 | 3.3 |
| $C_3$, % WT | 1.3 | 2.6 | 1.9 | 1.8 | 1.8 |
| $C_3=$, % VOL | 6.6 | 15.0 | 15.2 | 11.9 | 10.6 |
| $C_3=$, % WT | 3.7 | 8.5 | 8.6 | 6.8 | 6.0 |
| $C_2$, % WT | 0.7 | 0.7 | 0.6 | 0.5 | 0.6 |
| $C_2=$, % WT | 0.7 | 1.8 | 1.1 | 0.8 | 0.8 |
| $C_1$, % WT | 0.8 | 0.7 | 0.7 | 0.7 | 0.8 |
| $H_2$, % WT | 0.22 | 0.19 | 0.26 | 0.24 | 0.24 |
| $H_2S$, % WT | 0.86 | 0.58 | 0.86 | 0.98 | 0.80 |
| HYDROGEN FACTOR | 115 | 73 | 121 | 144 | 118 |
| ALKYLATE, % VOL | 24.2 | 43.5 | 38.5 | 33.6 | 30.3 |
| $C_5$ + GASOLINE + ALKYLATE, % VOL | 76.0 | 78.5 | 81.0 | 79.6 | 78.2 |
| OUTSIDE I—$C_4$, % VO | 8.6 | 16.8 | 17.1 | 14.6 | 12.5 |
| RON, $C_5$+ GASOLINE | 90.0 | 93.1 | 92.2 | 91.5 | 90.8 |
| RON, $C_5$+ GASOLINE + ALKYLATE | 91.4 | 93.5 | 92.8 | 92.4 | 91.9 |
| LFO, % WT | 27.6 | 27.2 | 27.4 | 27.5 | 26.6 |
| HFO, % WT | 5.2 | 5.6 | 5.4 | 5.3 | 6.1 |
| G + D, % WT | 70.4 | 56.7 | 63.1 | 65.7 | 66.3 |

TABLE 3

Octane/Yield Shifts for Catalysts of Examples 4–6
Versus Catalyst of Example 2
@ 70 vol % Conversion

| Catalyst of Example | 4 | 5 | 6 |
|---|---|---|---|
| $C_5^+$ gasoline, vol % | −9.6 | −6.2 | −4.2 |
| RON | 2.2 | 1.5 | 0.8 |
| $C_5^+$ gasoline/RON | 4.4 | 4.1 | 5.3 |
| $C_3^= + C_4^= + i\text{-}C_4$, vol % | 10.4 | 6.4 | 4.3 |
| Gas + poten. alky., vol % | 5.0 | 3.6 | 2.2 |

EXAMPLE 8

In the manner of Example 7, ZSM-5 was also evaluated as a cracking catalyst additive. Table 4 compares the results for ZSM-5 vs ZSM-57. This Table 4 shows unique yield shifts for ZSM-57, i.e., larger $C_3$ shifts, larger gasoline + potential alkylate shifts, etc.

TABLE 4

Calcined Additives FFB Yield Shifts
ZSM-5 @ 72% Conversion
ZSM-57 @ ~70% Conversion

| Yield Shifts | 0.1% | | 0.25% | | 0.5% | |
|---|---|---|---|---|---|---|
| | ZSM-5 | -57 | ZSM-5 | -57 | ZSM-5 | -57 |
| Gasoline, vol % | −2.5 | (−4.2) | −5.0 | (−6.2) | −7.9 | (−9.6) |
| Total $C_4$'s, vol % | 1.7 | (0.0) | 2.8 | (0.9) | 4.4 | (1.4) |
| Dry Gas, wt % | 0.5 | (2.9) | 2.0 | (3.6) | 3.0 | (5.8) |
| Coke, wt % | 0.4 | (0.03) | 0.4 | (0.34) | 0.7 | (.31) |
| $iC_4$, vol % | 1.2 | (0.5) | 1.5 | (0.7) | 2.9 | (1.6) |
| $C_4=$, vol % | 0.6 | (−0.2) | 1.3 | (0.4) | 1.7 | (0.2) |
| $C_3=$, vol % | 1.0 | (4.0) | 3.0 | (5.3) | 4.6 | (8.6) |
| $C_5^+$ Gas + Pot. Alky, vol % | −0.1 | (2.2) | 2.1 | (3.6) | 2.1 | (5.0) |
| Outside $i\text{-}C_4$, vol % | 0.6 | (3.9) | 3.4 | (6.0) | 4.2 | (8.5) |
| RON Gasoline | 1.2 | (0.8) | 2.7 | (1.5) | 3.4 | (2.2) |
| RON G + PA | 1.0 | (0.5) | 2.1 | (1.0) | 2.5 | (1.4) |

What is claimed is:

1. A cracking catalyst composition comprising, as a first component, a large pore crystalline molecular sieve and, as a second component, ZSM-57.

2. A catalyst according to claim 1, wherein the first component is in the hydrogen, rare earth or ammonium form.

3. A catalyst according to claim 1, wherein the first component is a rare earth-treated material.

4. A catalyst according to claim 1, wherein said catalyst has been thermally treated at a temperature up to about 760° C. in the presence or absence of steam.

5. A catalyst according to claim 1, wherein the second component comprises from about 0.01 to about 25 wt % of the total cracking catalyst composition.

6. A catalyst according to claim 1, wherein the second component comprises from about 0.1 to about 10 wt % of the total cracking catalyst composition.

7. A catalyst according to claim 1, wherein the first component is selected from the group consisting of zeolite X, zeolite Y, USY, dealuminated X, dealuminated Y, dealuminated USY, dealuminated-silicon-enriched zeolite X, dealuminated-silicon-enriched zeolite Y, dealuminated-silicon-enriched USY and mixtures thereof.

8. A catalyst according to claim 1, wherein the first component is USY.

9. A catalyst according to claim 1, wherein the first component is selected from the group consisting of Zeolite Omega, ZSM-20, mordenite, Zeolite Beta, Zeolite L, and mixtures thereof.

10. A catalyst according to claim 1, wherein the large pore crystalline molecular sieve comprises the silicoaluminophosphates MCM-9, SAPO-5, SAPO-37, SAPO-31, SAPO-40, SAPO-41 and mixtures thereof.

11. A catalyst according to claim 1, wherein the large pore crystalline molecular sieve includes the aluminophosphates $AlPO_4\text{-}5$, $AlPO_4\text{-}8$ and VPI-5.

12. A catalyst according to claim 1, wherein the large pore molecular sieve has a Constraint Index of less than 1.

13. A catalyst according to claim 1, wherein the first and/or second component is combined with a binder material.

14. A catalyst according to claim 1, wherein the first and second components are combined together with a binder material.

15. A catalyst according to claim 1, wherein said catalyst composition comprises, as a third component, a zeolite other than ZSM-57 which has a Constraint Index of 1 to 12.

16. A catalyst according to claim 1 further comprising a noble metal and/or rhenium.

* * * * *